United States Patent [19]
Dudley

[11] Patent Number: 6,009,320
[45] Date of Patent: Dec. 28, 1999

[54] VEHICLE ALARM SYSTEM TRIGGERABLE CELL PHONE ACTIVATION CIRCUIT

[76] Inventor: Sandra L. Dudley, 422 Mohawk St., Mobile, Ala. 36606

[21] Appl. No.: 08/908,365

[22] Filed: Aug. 7, 1997

[51] Int. Cl.⁶ .................................................. H04M 11/00
[52] U.S. Cl. ......................... 455/404; 455/517; 455/552; 340/425.5; 340/426
[58] Field of Search ..................................... 455/410, 411, 455/550, 551, 552, 517, 31.3, 404, 524; 340/425.5, 426, 539, 531, 825.44; 379/37, 38

[56] References Cited

U.S. PATENT DOCUMENTS

| | | | |
|---|---|---|---|
| 5,276,728 | 1/1994 | Pagliaroli et al. | 379/53 |
| 5,448,218 | 9/1995 | Espinosa | 340/426 |
| 5,486,806 | 1/1996 | Firari et al. | 340/426 |
| 5,563,453 | 10/1996 | Nyfelt | 307/10.2 |

*Primary Examiner*—Reinhard J. Eisenzopf
*Assistant Examiner*—Sam Bhattacharya
*Attorney, Agent, or Firm*—Joseph N. Breaux

[57] ABSTRACT

A cell phone activation circuit that includes an activation cable electrically connectable to an alarm output of a vehicle alarm system; a pager mode integrated circuit having a dual tone telephone tone generator and sufficient programmable pager phone number memory to store a pager number; a cell phone mode integrated circuit having a digital to analog audio generating circuit a dual tone telephone tone generator a programmable phone number memory of sufficient size to store a contact phone number, and an audio message memory having an digitized audio message stored therein; a number entry keypad in user selectable connection with the programmable pager phone number memory and the programmable phone number memory; a selector switch wired in connection with the pager mode integrated circuit and the cell phone mode integrated circuit in a manner to allow a user to selectively enable operation of the pager mode integrated circuit and the cell phone mode integrated circuit; a cell phone power on control line output in connection with the activation cable; and a cell phone microphone circuit interface line that is connectable to the microphone circuit of a cell phone and that is in connection with the outputs of the pager mode integrated circuit and the cell phone mode integrated circuit.

16 Claims, 1 Drawing Sheet

VEHICLE ALARM SYSTEM TRIGGERABLE CELL PHONE ACTIVATION CIRCUIT

TECHNICAL FIELD

The present invention relates to alarm systems for vehicles and more particularly to a vehicle alarm system triggerable cell phone activation circuit that includes an activation cable electrically connectable to an alarm output of a vehicle alarm system; a pager mode integrated circuit having a dual tone telephone tone generator and sufficient programmable pager phone number memory to store a pager number; a cell phone mode integrated circuit having a digital to analog audio generating circuit, a dual tone telephone tone generator, a programmable phone number memory of sufficient size to store a contact phone number, and an audio message memory having an digitized audio message stored therein; a number entry keypad in user selectable connection with the programmable pager phone number memory and the programmable phone number memory; a two position selector switch wired in connection with the pager mode integrated circuit and the cell phone mode integrated circuit in a manner to allow a user to selectively enable operation of the pager mode integrated circuit and the cell phone mode integrated circuit; a cell phone power on control line output in connection with the activation cable; and a cell phone microphone circuit interface line that is connectable to the microphone circuit of a cell phone and that is in connection with the outputs of the pager mode integrated circuit and the cell phone mode integrated circuit; the pager mode integrated circuit being responsive to an activation signal on the activation cable when the pager mode integrated circuit is selected by the two position mode selector switch in a manner to generate the audio telephone dialing tones on the cell phone microphone circuit interface line that correspond to the stored beeper phone number; the cell phone activation circuit mode integrated circuit being responsive to an activation signal on the activation cable when the cell phone mode integrated circuit is selected by the two position mode selector switch in a manner to generate the audio telephone dialing tones on the cell phone microphone circuit interface line that correspond to the stored contact phone number and to then generate on the cell phone microphone circuit interface line analog audio signal that corresponds to the digitized digital audio message stored in the digital audio memory.

BACKGROUND OF THE INVENTION

Although a conventional vehicle alarm can notify a vehicle owner within hearing range of an audible alarm horn or siren output, it does not have any mechanism for alerting a vehicle owner out of hearing range when an intruder or vehicle thief is attempting to burglarize or steal the vehicle. It would be a benefit, therefore, to have a cell phone activation circuit that was triggerable by a vehicle alarm system that could initiate a dialing sequence on a vehicle cell phone. In addition, because it may be desirable to dial either a cell phone or beeper number, it would be a benefit to have such a cell phone activation circuit that included a key pad to allow a user to enter one or more user selected dialing numbers. It would also be a benefit if the cell phone activation circuit included mode select circuitry to allow a user to select between a pager mode and a cell phone mode, and that included audio output circuitry for generating an audio message from stored digital audio message data stored within a digital audio memory.

SUMMARY OF THE INVENTION

It is thus an object of the invention to provide a vehicle alarm system triggerable cell phone activation circuit.

It is a further object of the invention to provide a vehicle alarm system triggerable cell phone activation circuit that initiates a dialing sequence on a vehicle cell phone when triggered by the vehicle alarm system.

It is a still further object of the invention to provide a vehicle alarm system triggerable cell phone activation circuit that includes a key pad to allow a user to enter one or more user selected dialing numbers.

It is a still further object of the invention to provide a vehicle alarm system triggerable cell phone activation circuit that includes mode select circuitry to allow a user to select between a pager mode and a cell phone mode.

It is a still further object of the invention to provide a vehicle alarm system triggerable cell phone activation circuit that includes audio output circuitry for generating an audio message from stored digital audio message data stored within a digital audio memory.

It is a still further object of the invention to provide a vehicle alarm system triggerable cell phone activation circuit that includes an activation cable electrically connectable to an alarm output of a vehicle alarm system; a pager mode integrated circuit having a dual tone telephone tone generator and sufficient programmable pager phone number memory to store a pager number; a cell phone mode integrated circuit having a digital to analog audio generating circuit, a dual tone telephone tone generator, a programmable phone number memory of sufficient size to store a contact phone number, and an audio message memory having an digitized audio message stored therein; a number entry keypad in user selectable connection with the programmable pager phone number memory and the programmable phone number memory; a two position selector switch wired in connection with the pager mode integrated circuit and the cell phone mode integrated circuit in a manner to allow a user to selectively enable operation of the pager mode integrated circuit and the cell phone mode integrated circuit; a cell phone power on control line output in connection with the activation cable; and a cell phone microphone circuit interface line that is connectable to the microphone circuit of a cell phone and that is in connection with the outputs of the pager mode integrated circuit and the cell phone mode integrated circuit; the pager mode integrated circuit being responsive to an activation signal on the activation cable when the pager mode integrated circuit is selected by the two position mode selector switch in a manner to generate the audio telephone dialing tones on the cell phone microphone circuit interface line that correspond to the stored beeper phone number; the cell phone activation circuit mode integrated circuit being responsive to an activation signal on the activation cable when the cell phone mode integrated circuit is selected by the two position mode selector switch in a manner to generate the audio telephone dialing tones on the cell phone microphone circuit interface line that correspond to the stored contact phone number and to then generate on the cell phone microphone circuit interface line analog audio signal that corresponds to the digitized digital audio message stored in the digital audio memory.

It is a still further object of the invention to provide a vehicle alarm system triggerable cell phone activation circuit that accomplishes some or all of the above objects in combination.

Accordingly, a vehicle alarm system triggerable cell phone activation circuit is provided. The cell phone activation circuit includes an activation cable electrically connectable to an alarm output of a vehicle alarm system; a pager mode integrated circuit having a dual tone telephone tone generator and sufficient programmable pager phone number memory to store a pager number; a cell phone mode integrated circuit having a digital to analog audio generating circuit, a dual tone telephone tone generator, a programmable phone number memory of sufficient size to store a contact phone number, and an audio message memory having an digitized audio message stored therein; a number entry keypad in user selectable connection with the programmable pager phone number memory and the programmable phone number memory; a two position selector switch wired in connection with the pager mode integrated circuit and the cell phone mode integrated circuit in a manner to allow a user to selectively enable operation of the pager mode integrated circuit and the cell phone mode integrated circuit; a cell phone power on control line output in connection with the activation cable; and a cell phone microphone circuit interface line that is connectable to the microphone circuit of a cell phone and that is in connection with the outputs of the pager mode integrated circuit and the cell phone mode integrated circuit; the pager mode integrated circuit being responsive to an activation signal on the activation cable when the pager mode integrated circuit is selected by the two position mode selector switch in a manner to generate the audio telephone dialing tones on the cell phone microphone circuit interface line that correspond to the stored beeper phone number; the cell phone activation circuit mode integrated circuit being responsive to an activation signal on the activation cable when the cell phone mode integrated circuit is selected by the two position mode selector switch in a manner to generate the audio telephone dialing tones on the cell phone microphone circuit interface line that correspond to the stored contact phone number and to then generate on the cell phone microphone circuit interface line analog audio signal that corresponds to the digitized digital audio message stored in the digital audio memory.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
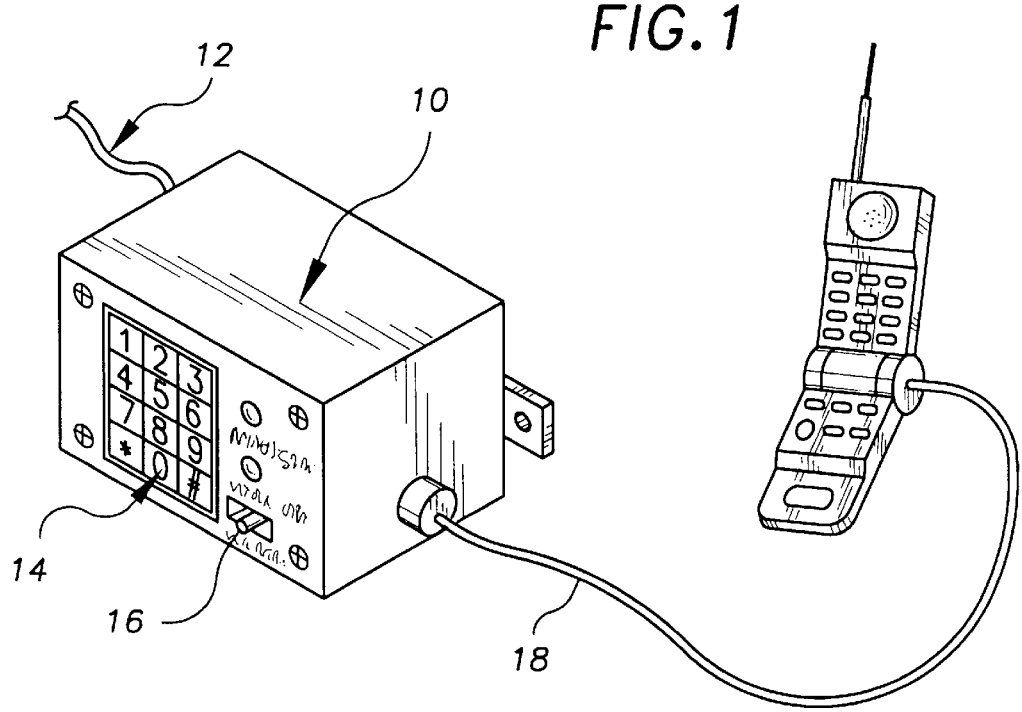
FIG. 1 is a perspective view of the circuitry housing of the vehicle alarm system triggerable cell phone activation circuit of the present invention showing the activation cable, the number entry keypad, the two position mode select switch, and the vehicle alarm system triggerable cell phone activation interface cable; and a representative vehicle alarm system triggerable cell phone activation connected to the vehicle alarm system triggerable cell phone activation interface cable.

FIG. 1 shows the circuitry housing, generally designated 10, ot the vehicle alarm system triggerable cell phone activation circuit of the present invention. Housing 10 has an activation cable 12 extending outwardly from one side surface; a number entry keypad 14 and a two position mode select switch 16 from another side surface; and a cell phone activation interface cable 18 extending outwardly from still another side surface.

Figure 2:
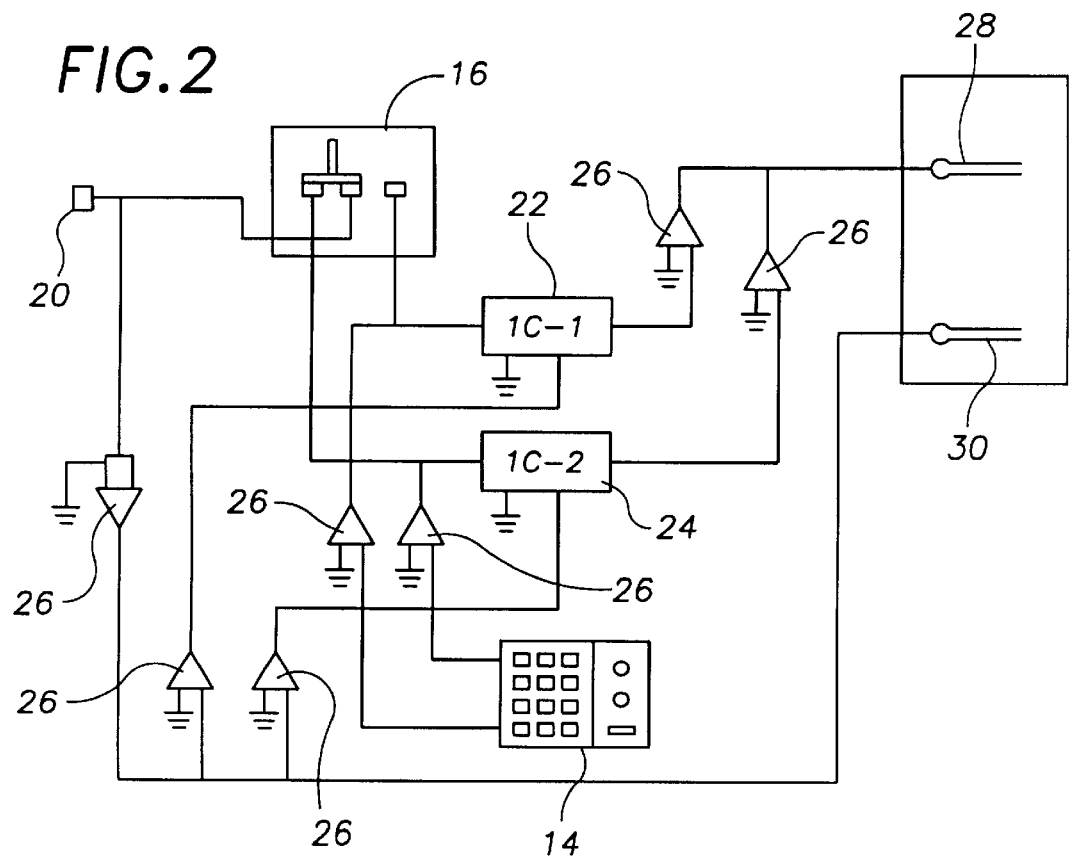
FIG. 2 is a schematic diagram of the circuitry of the device of FIG. 1 showing the activation input, the two position mode select switch, the pager mode integrated circuit, cell phone mode integrated circuit, the number entry keypad, a number of buffer circuits, the vehicle alarm system triggerable cell phone activation microphone activation connecting line, arid the vehicle alarm system triggerable cell phone activation power on control line.

With reference to FIG. 2, the vehicle alarm system triggerable cell phone activation circuit of the present invention is shown schematically and includes an activation input 20 connectable to activation cable 12 (FIG. 1); number entry keypad 14; two position mode select switch 16; a pager mode integrated circuit 22; a cell phone mode integrated circuit 24; a number of buffer circuits 26; a microphone activation connecting line 28; and an activation power on control line 30. In use, the user selects the operating mode by positioning two-position mode select switch 16 to the desired mode. Operation is then as previously described.

It can be seen from the preceding description that a vehicle alarm system triggerable cell phone activation circuit has been provided that initiates a dialing sequence on a vehicle cell phone when triggered by the vehicle alarm system; that includes a key pad for entering one or more user selected dialing numbers; that includes mode select circuitry to allow a user to select between a pager mode and a cell phone mode; that includes audio output circuitry for generating an audio message from stored digital audio message data stored within a digital audio memory; and that includes an activation cable electrically connectable to an alarm output of a vehicle alarm system; a pager mode integrated circuit having a dual tone telephone tone generator and sufficient programmable pager phone number memory to store a pager number; a cell phone mode integrated circuit having a digital to analog audio generating circuit, a dual tone telephone tone generator, a programmable phone number memory of sufficient size to store a contact phone number, and an audio message memory having an digitized audio message stored therein; a number entry keypad in user selectable connection with the programmable pager phone number memory and the programmable phone number memory; a two position selector switch wired in connection with the pager mode integrated circuit and the cell phone mode integrated circuit in a manner to allow a user to selectively enable operation of the pager mode integrated circuit and the cell phone mode integrated circuit; a cell phone power on control line output in connection with the activation cable; and a cell phone microphone circuit interface line that is connectable to the microphone circuit of a cell phone and that is in connection with the outputs of the pager mode integrated circuit and the cell phone mode integrated circuit; the pager mode integrated circuit being responsive to an activation signal on the activation cable when the pager mode integrated circuit is selected by the two position mode selector switch in a manner to generate the audio telephone dialing tones on the cell prone microphone circuit interface line that correspond to the stored beeper phone number; the cell phone mode integrated circuit being responsive to an activation signal on the activation cable when the cell phone mode integrated circuit is selected by the two position mode selector switch in a manner to generate the audio telephone dialing tones on the cell phone microphone circuit interface line that correspond to the stored contact phone number and to then generate on the cell phone microphone circuit interface line analog audio signal that corresponds to the digitized digital audio message stored in the digital audio memory.

It is noted that the embodiment of the vehicle alarm system triggerable cell phone activation circuit described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A vehicle alarm system triggerable cell phone activation circuit comprising:

an activation cable electrically connectable to an alarm output of a vehicle alarm system;

a pager mode integrated circuit having a pager mode enable input connectable to said activation cable, a dual tone telephone tone generator and sufficient programmable pager phone number memory to store a pager number;

a cell phone mode integrated circuit having a cell phone mode enable input connectable to said activation cable, a digital to analog audio generating circuit, a dual tone telephone tone generator, a programmable phone number memory of sufficient size to store a contact phone number, and an audio message memory having an digitized audio message stored therein;

a number entry keypad in user selectable connection with said programmable pager phone number memory and said programmable phone number memory;

a selector switch wired in connection with said pager mode integrated circuit and said cell phone mode integrated circuit in a manner to allow a user to selectively enable operation of said pager mode integrated circuit and said cell phone mode integrated circuit;

a cell phone power on control line output in connection with said activation cable; and a cell phone microphone circuit interface line that is connectable to said microphone circuit of a cell phone and that is in connection with said outputs of said pacer mode integrated circuit and said cell phone mode integrated circuit;

said pager mode integrated circuit being responsive to an activation signal on said activation cable when said pager mode integrated circuit is selected by said selector switch in a manner to generate audio telephone dialing tones on said cell phone microphone circuit interface line that correspond to said stored pager number;

said cell phone mode integrated circuit being responsive to an activation signal on said activation cable when said cell phone mode integrated circuit is selected by said selector switch in a manner to generate said audio telephone dialing tones on said cell phone microphone circuit interface line that correspond to said stored contact phone number and to then generate on said cell phone microphone circuit interface line analog audio signal that corresponds to said digitized digital audio message stored in said digital audio memory.

2. The vehicle alarm system triggerable cell phone activation circuit of claim 1, wherein:

said selector switch is a two-position switch.

3. The vehicle alarm system triggerable cell phone activation circuit of claim 1 further inclduing:

a housing having an exterior surface upon which said number entry keypad is installed.

4. The vehicle alarm system triggerable cell phone activation circuit of claim 1 wherein:

said activation cable includes two conducting wires connectable across a normally open output relay of a vehicle alarm system.

5. The vehicle alarm system triggerable cell phone activation circuit of claim 1, wherein:

said number entry keypad has first and second keypad outputs, said first keypad output being in connection with said pager mode integrated circuit, said second keypad output being in connection with said cell phone mode integrated circuit.

6. The vehicle alarm system triggerable cell phone activation circuit of claim 2 further including:

a housing having an exterior surface upon which said number entry keypad is installed.

7. The vehicle alarm system triggerable cell phone activation circuit of claim 2 wherein:

said activation cable includes two conducting wires connectable across a normally open output relay of a vehicle alarm system.

8. The vehicle alarm system triggerable cell phone activation circuit of claim 2, wherein:

said number entry keypad has first and second keypad outputs, said first keypad output being in connection with said pager mode integrated circuit, said second keypad output being in connection with said cell phone mode integrated circuit.

9. The vehicle alarm system triggerable cell phone activation circuit of claim 6 wherein:

said activation cable includes two conducting wires connectable across a normally open output relay of a vehicle alarm system.

10. The vehicle alarm system triggerable cell phone activation circuit of claim 6, wherein:

said number entry keypad has first and second keypad outputs, said first keypad output being in connection with said pager mode integrated circuit, said second keypad output being in connection with said cell phone mode integrated circuit.

11. The vehicle alarm system triggerable cell phone activation circuit of claim 9, wherein:

said number entry keypad has first and second keypad outputs, said first keypad output being in connection with said pager mode integrated circuit, said second keypad output being in connection with said cell phone mode integrated circuit.

12. The vehicle alarm system triggerable cell phone activation circuit of claim 7, wherein:

said number entry keypad has first and second keypad outputs, said first keypad output being in connection with said pager mode integrated circuit, said second keypad output being in connection with said cell phone mode integrated circuit.

13. The vehicle alarm system triggerable cell phone activation circuit of claim 3 wherein:

said activation cable includes two conducting wires connectable across a normally open output relay of a vehicle alarm system.

14. The vehicle alarm system triggerable cell phone activation circuit of claim 3, wherein:

said number entry keypad has first and second keypad outputs, said first keypad output being in connection with said pager mode integrated circuit, said second keypad output being in connection with said cell phone mode integrated circuit.

15. The vehicle alarm system triggerable cell phone activation circuit of claim 13, wherein:

said number entry keypad has first and second keypad outputs, said first keypad output being in connection with said pager mode integrated circuit, said second keypad output being in connection with said cell phone mode integrated circuit.

16. The vehicle alarm system triggerable cell phone activation circuit of claim 4, wherein:

said number entry keypad has first and second keypad outputs, said first keypad output being in connection with said pager mode integrated circuit, said second keypad output being in connection with said cell phone mode integrated circuit.

* * * * *